United States Patent [19]
Pelizzoni et al.

[11] 3,712,420
[45] Jan. 23, 1973

[54] ENGINE LUBRICATION SYSTEM

[75] Inventors: Winton J. Pelizzoni, Hagerstown, Md.; Charles R. Baumbaugh, Greencastle, Pa.; William A. Calliss, Hagerstown, Md.

[73] Assignee: Mack Trucks, Inc., Allentown, Pa.

[22] Filed: April 6, 1971

[21] Appl. No.: 131,711

[52] U.S. Cl. ............ 184/103 R, 137/453, 184/105 R
[51] Int. Cl. ............................................. F01m 11/12
[58] Field of Search ............... 184/6.4, 103 R, 105 R; 123/196 R; 137/453, 454

[56] References Cited

UNITED STATES PATENTS

| | | | |
|---|---|---|---|
| 2,564,231 | 8/1951 | Pitney | 184/103 R |
| 2,617,495 | 11/1952 | Johnson | 184/103 R X |
| 2,081,315 | 5/1937 | Weber | 184/103 R |
| 1,600,404 | 9/1926 | Dudley | 184/105 R |
| 2,946,328 | 7/1960 | Mett, Jr. et al. | 123/196 R |
| 2,615,442 | 10/1952 | Berry | 184/103 R |
| 2,207,527 | 7/1940 | Weber | 137/453 X |

*Primary Examiner*—Manuel A. Antonakas
*Attorney*—Granville M. Brumbaugh et al.

[57] ABSTRACT

An engine lubrication system comprising a primary reservoir containing lubricant at a predetermined level and a hermetically sealed auxiliary reservoir containing additional lubricant. A pump for circulating lubricant from the primary reservoir to operating components of an engine directs a portion of the circulating lubricant to the auxiliary reservoir through a conduit. Another conduit provides a path through which lubricant in the auxiliary reservoir may flow to the primary reservoir, and a control conduit, having one end coupled to the main reservoir at the predetermined level and the other end coupled to the auxiliary reservoir at a position above the lubricant contained therein, allows air to enter the auxiliary reservoir when the level of oil in the primary reservoir drops below the predetermined level, whereby oil in the auxiliary reservoir is dumped through the second conduit to the primary reservoir. A removable cap hermetically seals an opening at the top of the auxiliary reservoir through which additional lubricant may be added. When the cap is removed, a valve automatically closes the second conduit to prevent the flow of lubricant from the auxiliary reservoir to the primary reservoir.

6 Claims, 3 Drawing Figures

PATENTED JAN 16 1973

INVENTORS.
WINTON J. PELIZZONI,
CHARLES R. BAUMBAUGH &
BY WILLIAM A. CALLISS their ATTORNEYS.

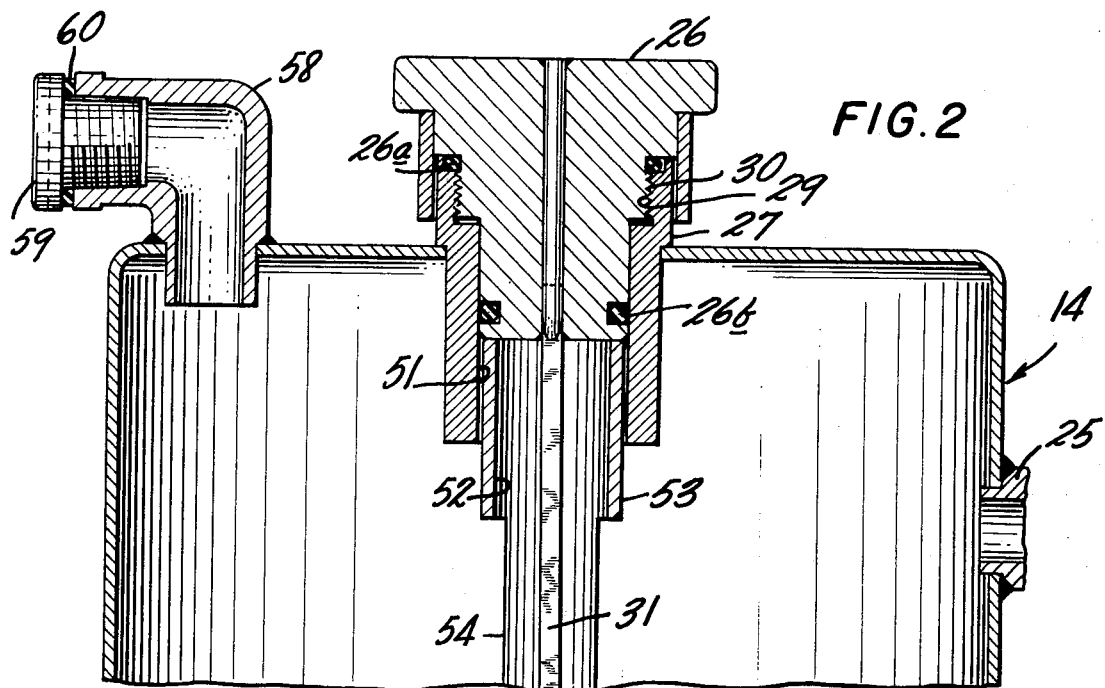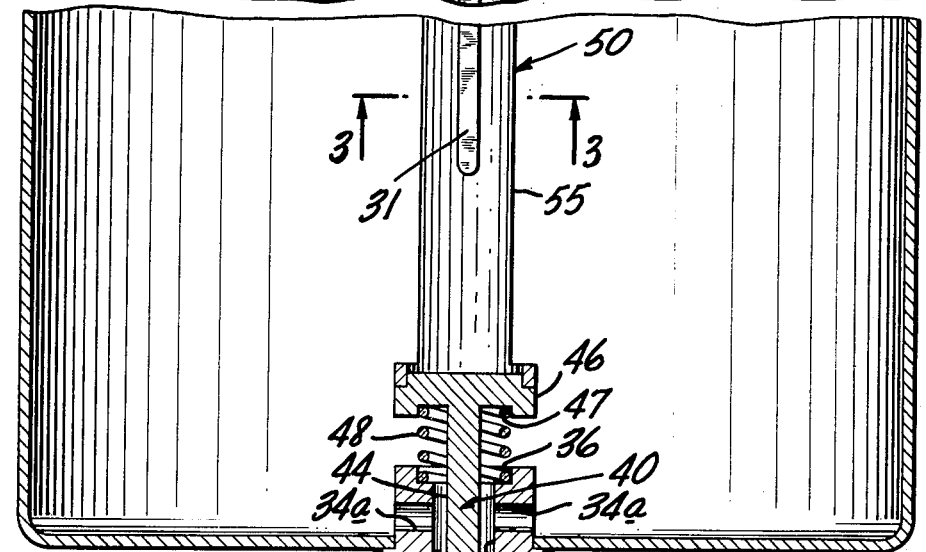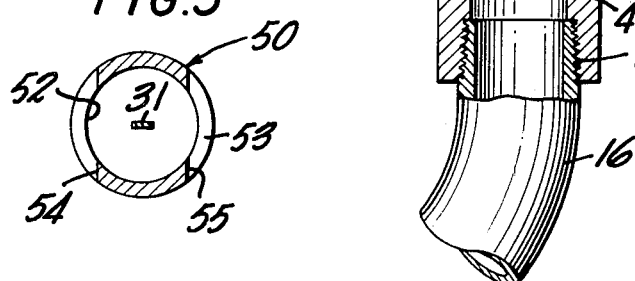

ENGINE LUBRICATION SYSTEM

BACKGROUND OF THE INVENTION

This invention relates generally to engine lubrication systems and, more particularly, to a lubrication system having an auxiliary reservoir in addition to a primary reservoir, together with control apparatus for selectively delivering lubricant to the primary reservoir from the auxiliary reservoir.

Internal combustion engines are equipped with an oil pan or oil reservoir for storing the lubricant necessary for normal engine lubrication and an oil pump for transporting the lubricant to the operating components of the engine. In order to provide sufficient oil pressure to the operating components for proper lubrication, the inlet to the oil pump is submersed below the normal operating oil level.

It is desirable to maintain an oil level in the primary reservoir which is high enough to provide an adequate head over the pump inlet to prevent cavitation which would interrupt oil flow to the basic engine system, yet which is low enough to prevent connecting rod dipping or crankshaft seal leakage when the engine is operated at extreme angles.

In certain cases where the engine consumes excessive amounts of oil or there are long runs between minor maintenance checks, it is possible that the lubricant in the engine reservoir could be depleted to a point below the minimum operating level thus tending to create a critical condition which could lead to bearing starvation, etc.

The Edwards U.S. Pat. No. 1,428,017 discloses a lubrication system which utilizes an auxiliary reservoir located near and above the main engine oil reservoir and connected thereto so as to maintain the level of oil in the engine pan at a desired level. Two conduits are provided, each having one end coupled to the auxiliary reservoir and the other end coupled to the main engine reservoir. The first conduit is used to transport oil from the auxiliary reservoir to the engine reservoir, and the second line serves as a control line with one end attached to the main engine reservoir at the desired oil level and the other end attached to the auxiliary reservoir above the level of lubricant contained therein. A third line is also provided having one end connected to the auxiliary reservoir above the oil level therein and the other end connected to the intake manifold of the engine.

This particular system operates by employing the intake manifold of the engine to decrease the pressure above the lubricant in the auxiliary reservoir when the end of the control line connected to the main engine reservoir is submersed in oil. When this pressure is decreased below the pressure above the lubricant in the main engine reservoir, the auxiliary reservoir is able to maintain a particular level of oil therein without dumping it into the main engine reservoir—the lower the pressure, that is, the greater the partial vacuum, above the lubricant in the auxiliary reservoir, the more lubricant the auxiliary reservoir is able to hold. As the pressure above the lubricant in the auxiliary reservoir is decreased, the pressure above the lubricant in the main reservoir forces lubricant from the main reservoir to flow through the control line and the first conduit to the auxiliary reservoir.

When the oil level in the main engine reservoir drops below the connection of the control line with the main engine reservoir, air is admitted to the space above the lubricant in the auxiliary reservoir, the vacuum therein is lost, and lubricant is dumped to the main reservoir until that connection is submersed in oil, whereby the intake manifold is able once again to establish a partial vacuum above the lubricant in the auxiliary reservoir.

This system operates poorly when the engine is operated at high or open throttle settings, because the volume of oil which can be held by the auxiliary reservoir is quite low. This is because the vacuum in the intake manifold decreases as the throttle is opened, causing a corresponding decrease in the vacuum in the auxiliary reservoir. Accordingly, most of the oil in the auxiliary reservoir is dumped into the main reservoir resulting in an overfull condition, inasmuch as the vacuum in the auxiliary reservoir is insufficient to lower the oil level in the main reservoir to the desired level. As a result, the connecting rods will dip into the oil, and oil may leak past the crankshaft seals if the engine is operated at extreme angles. If this condition obtains for a significant period of time while crusing at a high engine speed, for example, the connecting rod dipping will increase the load on the engine and thus cause increased wear and fuel consumption, while elevating the temperature of the lubricant and thus limiting its ability to cool the elements washed thereby. In addition, the advantages of an auxiliary sump are lost if such sump holds a minimal amount of lubricant, or if the capacity of the auxiliary sump varies in accordance with the changing degree of vacuum in the intake manifold.

Furthermore, when the vacuum in the intake manifold is high causing the auxiliary reservoir to be excessively full or when oil in the auxiliary reservoir is splashed about because of the movement of the vehicle, lubricant may be drawn through the conduit connected to the intake manifold and sucked into the combustion chambers causing excessive carbon deposits, poor combustion and excessive emissions.

SUMMARY OF THE INVENTION

The above-described and other disadvantages of presently known engine lubrication systems are overcome, in accordance with the invention, by a novel and improved lubricating system.

The improved engine lubrication system utilizes an auxiliary reservoir, located near and above the main engine reservoir. Three lines connect the auxiliary reservoir to the engine reservoir, the first line being a gravity feed line having one end connected to the engine reservoir at a position below a desired or predetermined oil level and the other end connected to the bottom of the auxiliary reservoir. The second line is a control line having one end connected to the engine reservoir at the predetermined oil level and the other end connected to the upper portion of the auxiliary reservoir above the level of oil contained therein. When the oil level in the engine reservoir drops below the predetermined level, air is admitted to the upper portion of the auxiliary reservoir through the control line. This in turn allows oil to drain from the auxiliary reservoir through the gravity feed line to the engine reservoir. The flow of oil from the auxiliary reservoir will continue until the oil level in the engine reservoir reaches the predetermined level, at which time the control line opening in the engine reservoir will be submersed in oil, preventing additional air from being admitted to the top portion of the auxiliary reservoir and thus retaining the remaining oil in the auxiliary reservoir due to the partial vacuum established therein. The third line is connected between the pressure side of the engine lubrication system and the auxiliary reservoir for transporting to the auxiliary reservoir a portion of oil that is being circulated in the engine.

The advantages of this system are that a constant level of oil may be maintained in the engine reservoir, and the total capacity of the engine reservoir may be increased by the amount of oil in the auxiliary reservoir without having to increase the level of the oil in the engine reservoir or the size of the engine reservoir itself.

In order to keep the oil in the auxiliary reservoir from draining into the main engine reservoir when checking the oil level in the auxiliary reservoir or when refilling this reservoir, an automatic shut-off valve is provided for preventing the flow of oil through the gravity feed line when the fill spout of the auxiliary reservoir is opened to the atmosphere destroying the partial vacuum therein. This shut-off valve is comprised of a spring loaded plunger, located in the gravity feed line at the connection with the auxiliary reservoir, which is normally biased to stop the oil flow in the gravity feed line.

A removable screw-type cap hermetically seals the fill opening to the auxiliary reservoir when the cap is in place. Attached to the plunger is a spacer which, as the cap is secured, engages the cap and moves the plunger, against the force provided by the spring, to a position permitting oil to flow from the auxiliary reservoir to the main engine reservoir. When the cap is removed, the spring seats the plunger to prevent the auxiliary reservoir from being drained.

With this arrangement, working knowledge of the system is unnecessary, and it is not necessary to manually restrict flow from the auxiliary reservoir through the gravity feed line to the main engine reservoir when filling the auxiliary reservoir.

DETAILED DESCRIPTION OF THE DRAWINGS

In the drawings:

FIG. 2 is a sectional view of the auxiliary reservoir, taken along the line 2—2 of FIG. 1 and looking in the direction of the arrows; and FIG. 3 is a view taken along the line 3—3 of FIG. 2 and looking in the direction of the arrows.

DETAILED DESCRIPTION OF THE PREFERRED EMBODIMENT

Figure 1:
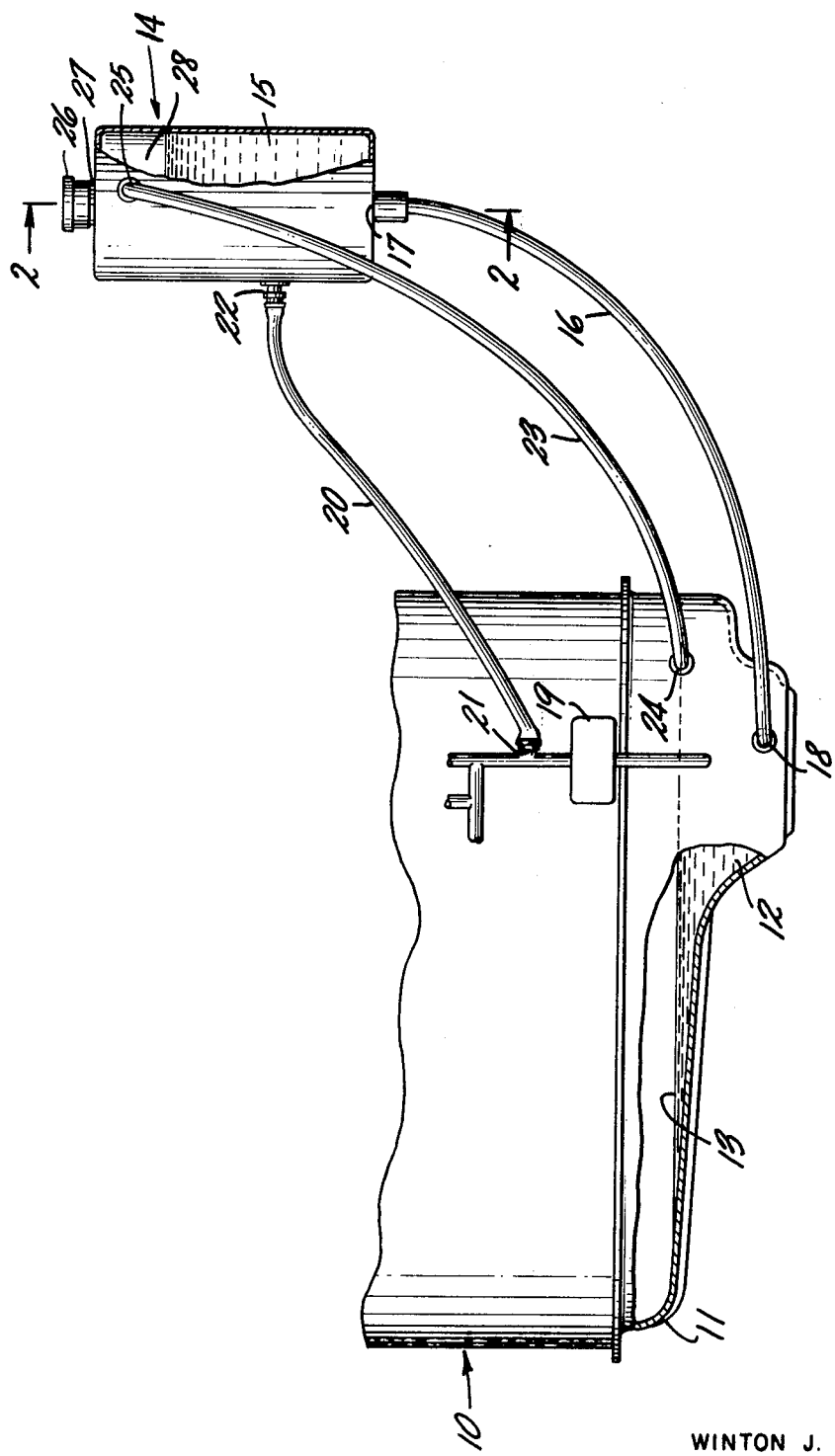
FIG. 1 is an elevational view of the lubrication system according to the present invention, portions being broken away for clarity.

Referring to FIG. 1, an engine crankcase 10 has an oil pan or main reservoir 11 attached to the bottom thereof. The main reservoir 11 contains lubricant 12 to a desired or predetermined level 13, and an auxiliary reservoir 14 contains additional lubricant 15 for supplementing the lubricant in the main reservoir 11. A conduit 16 has one end connected to an opening 17 in the bottom of the auxiliary reservoir 14 and has the other end connected to an opening 18 in the main reservoir 11 below the predetermined level 13.

A conventional oil pump 19 withdraws oil from the main reservoir 11 and circulates the oil under high pressure to the operating components of the engine in a manner well known to those skilled in the art. A conduit 20 has one end coupled to the high pressure side of the engine lubrication system at 21 and has the other end coupled to the auxiliary sump 14 at 22. A conduit 23 has one end connected to the main reservoir 11 at an opening 24 located at the predetermined level 13 and has the other end connected to the auxiliary reservoir 14 at an opening 25 located above the level of lubricant 15 contained therein.

A screw-on type cap 26 closes the fill spout 27 of the auxiliary reservoir 14. The cap 26 hermetically seals the auxiliary reservoir 14 when it is secured.

A partial vacuum is formed in the upper portion 28 of the auxiliary reservoir 14 when the cap is in place as a result of the drainage of a portion of the lubricant 15 to the main reservoir 11 through the conduit 16 and the drainage of lubricant through the conduit 23 to the main reservoir. The force provided by the pressure above the lubricant 12 in the main reservoir 11 supports a column of lubricant in the auxiliary reservoir 14, as is well known in the art.

If the level of the lubricant 12 in the main reservoir 11 falls below the predetermined level 13, air will be admitted to the upper portion 28 of the auxiliary reservoir 14. The resulting increase in pressure in the upper portion 28 permits lubricant in the auxiliary reservoir to drain through the conduit 16 into the main reservoir 11, because the decreased pressure differential between the pressure above the lubricant 12 in the main reservoir 11 and that in the upper portion 28 of the auxiliary reservoir 14 can support only a smaller column of lubricant. The drainage continues until the opening 24 in the main reservoir is submersed in oil. When this occurs, the flow of oil from the auxiliary reservoir 14 will cease.

Thus, lubricant which is lost due to leakage passed seals, gaskets or piston rings is automatically replenished from the auxiliary reservoir. In addition, because of the continuous pumping of lubricant from the main reservoir 11 to the auxiliary reservoir 14, the lubricant in the auxiliary reservoir is circulated through the main reservoir, thereby increasing the total engine sump capacity.

Referring to FIG. 2, the spout 27 includes internal threads 29 for engagement with external threads 30 of the screw-on type cap 26. A flexible oil level indicator 31 is affixed to the cap 26 so that when the cap is screwed on to the fill spout 27 the level indicator 31 is inserted into the interior of the auxiliary reservoir 14, so as to register the level of lubricant therein. The indicator 31 may be received in a complementary bore in the cap 26 by a force fit to provide a hermetic seal therebetween. A pair of conventional O-rings 26a and 26b carried by the cap 26 provide a hermetic seal between the cap and the fill spout 27 when the cap is secured thereto.

In order to prevent an overfull condition in the main reservoir 11 when the cap 26 is removed for checking the level of lubricant in the auxiliary reservoir 14 or for refilling the auxiliary reservoir, an automatic shut-off valve is provided for preventing the drainage of lubricant through the conduit 16 under these conditions.

A fitting 32 is mounted in the bottom of the auxiliary reservoir 14 for coupling the conduit 16 thereto by means of an interior threaded portion 33 in the lower end of the fitting for threaded engagement of the conduit 16.

The fitting 32 is formed with a passageway 34 therethrough comprising a central bore 35 which communicates with an upper bore 36 and a lower bore 37, both of larger diameter than the bore 35. A plurality of lateral passageways 34a communicate the central bore 35 with the interior of the auxiliary reservoir adjacent the bottom wall thereof, in order that substantially all of the lubricant in the auxiliary reservoir is available for supplementing the lubricant in the main reservoir. The interior surface of the fitting 32 between the bores 35 and 37 forms a valve seat 38 which cooperates with a valve member 40 in the form of a plunger, which is disposed in the passageway 34 for movement therein. The lower end of the valve member 40 is disposed in the lower bore 37 and carries a gasket or seal member 41, which is retained on the plunger by a washer 42 and a snap ring 43, the snap ring being received in a complementary groove formed in the plunger.

The plunger 40 is formed with a central portion 44, which extends through the bore 35 and provides an annular space therebetween when the gasket 41 is displaced from the valve seat 38 (as shown in FIG. 2), and a conical portion 45 extending from the portion 44 to the larger diameter end portion on which the gasket 41 is mounted. Above the central portion 44 is a larger diameter upper portion 46, the lower surface of which is formed with a bore 47, which receives the upper end of an expansion spring 48. The expansion spring is disposed about the plunger 40 between its upper portion 46 and the upper end of the fitting 32, the lower end of the spring 48 being received in the bore 36. The expansion spring 48 biases the plunger 40 in the upward direction as viewed in FIG. 2, so as to seat the gasket 41 against the valve seat 38 when the cap 26 is removed, as will be explained hereinafter. As the plunger moves upwardly, the conical portion 45 guides the gasket 41 into the desired engaging relation with the valve seat 38.

A spacer 50 is secured to the upper portion 46 of the valve element 40 and extends into, and is guided by, the bore 51 of the fill spout 27 through which lubricant may be added to the auxiliary reservoir 14. The spacer 50 is preferably tubular, having an interior chamber 52 for receiving the dip stick 31, and the lateral wall 53 of the spacer 50 has a pair of openings 54 and 55 therein to provide communication between the interior chamber 52 of the spacer 50 and the interior of the auxiliary reservoir 14, so that the level of the lubricant inside of the interior chamber equals that of the lubricant within the auxiliary reservoir, thereby enabling the dip stick 31 to record the level of the lubricant in the auxiliary reservoir. Also, lubricant added to the auxiliary reservoir through the fill spout 27 flows through the openings 54 and 55. (For simplicity, the lubricant 15 in the auxiliary reservoir has been omitted in FIGS. 2 and 3.) The openings 54 and 55 extend well below the lower end of the dip stick 31 when the cap 26 is secured to the fill spout, in order that the dip stick will not give a false reading and in order to minimize the amount of lubricant which may be trapped in the lower portion of the chamber 52.

The upper end of the spacer 50 extends sufficiently into the bore 51 of the fill spout 27, so that as the cap 26 is secured, it engages the spacer and drives it downwardly to depress the plunger 40, and the gasket 41 carried thereby, against the force of the biasing spring 48, thereby displacing the gasket 41 from the valve seat 38 while hermetically sealing the passageway through the fill spout. Accordingly, lubricant from the auxiliary reservoir 14 is permitted to flow through the conduit 16 when the level of the lubricant in the main reservoir 11 drops below the opening 24 in the main reservoir.

On the other hand, when the cap 26 is removed from the fill spout 27 in order to check the oil level in the auxiliary reservoir 14 or add lubricant thereto, lubricant is prevented from draining from the auxiliary reservoir, because the biasing spring 48 drives the gasket 41 into sealing engagement with the valve seat when the cap 26 is disengaged from the spacer 50.

A vent fitting 58 in the top of the auxiliary reservoir 14 is normally hermetically sealed by a cap 59 and a gasket 60. The auxiliary reservoir may be drained by removing the cap 59 while leaving the cap 26 in its secured position, so that the gasket 41 is displaced from the valve seat 38 to permit lubricant flow through the passageway 34.

Thus, it can be seen that this lubrication system maintains the desired lubricant level in the main engine reservoir and, at the same time, increases the total engine oil capacity to allow longer intervals between drain periods without overfilling the main reservoir or increasing the size thereof. The engine oil supplied to the operating components of the engine is cleaner because of the larger amount of oil to be circulated, and fewer stops are necessary to replenish oil consumed by the engine.

While the fundamental novel features of the invention have been shown and described, it will be understood that various substitutions, modifications and variations may be made by those skilled in the art without departing from the spirit and scope of the invention. Accordingly, all such modifications and variations are included within the intended scope of the invention as defined by the following claims.

We claim:

1. In an engine lubrication system having a main lubricant reservoir for containing lubricant at a predetermined level, a pump for withdrawing lubricant from the main reservoir and circulating the lubricant to operating components of an engine, an auxiliary lubricant reservoir, and a first conduit having one end coupled to the auxiliary reservoir and the other end coupled to the main reservoir for transporting lubricant in the auxiliary reservoir to the main reservoir, the improvement comprising a second conduit having one end coupled to the output of the pump and the other end coupled to the auxiliary reservoir for transporting a portion of the circulating lubricant to the auxiliary reservoir and control means operative when the pump is circulating lubricant for permitting lubricant in the auxiliary reservoir to be delivered to the main reservoir through the first conduit when the level of the lubricant in the main reservoir is below the predetermined level.

2. In an engine lubrication system having a main lubricant reservoir for containing lubricant at a predetermined level, a pump for withdrawing lubricant from the main reservoir and circulating this lubricant to operating components of an engine, an auxiliary lubricant reservoir, and a first conduit having one end coupled to the auxiliary reservoir and the other end coupled to the main reservoir for transporting lubricant in the auxiliary reservoir to the main reservoir, the improvement comprising a second conduit having one end coupled to the output of the pump and the other end coupled to the auxiliary reservoir for transporting a portion of the circulating lubricant to the auxiliary reservoir and control means comprising a conduit having one end coupled to the main reservoir at the predetermined level and the other end coupled to the auxiliary reservoir at a position above the lubricant contained therein whereby the control means permits lubricant in the auxiliary reservoir to be delivered to the main reservoir through the first conduit when the level of the lubricant in the main reservoir is below the predetermined level.

3. An engine lubrication system for an engine having a main lubricant reservoir for containing lubricant at a predetermined level and a pump for withdrawing lubricant from the main reservoir and circulating the lubricant to operating components of the engine, comprising an auxiliary lubricant reservoir having a first opening through which lubricant may be added to the system and a second opening for discharging lubricant, a first conduit having one end coupled to the second opening of the auxiliary reservoir and the other end coupled to the main reservoir for transporting lubricant in the auxiliary reservoir to the main reservoir, a second conduit having one end coupled to the output of the pump and the other end coupled to the auxiliary reservoir for transporting a portion of the circulating lubricant to the auxiliary reservoir, a control conduit having one end coupled to the main reservoir at the predetermined level and the other end coupled to the auxiliary reservoir at a position above the lubricant normally contained therein for controlling the flow of lubricant through the first conduit, a removable cap for hermetically sealing the first opening of the auxiliary reservoir, and valve means for selectively preventing flow of lubricant through the first conduit when the cap is removed.

4. The system according to claim 3 wherein the valve means includes a plunger positioned in the second opening and movable between a first position in which discharge of lubricant through the second opening is prevented and a second position in which discharge of lubricant through the second opening is permitted, and biasing means for urging the plunger into the first position, and further including a spacer coupled to the plunger for engaging the cap and moving the plunger to the second position against the force of the biasing means when the cap is secured to seal the first opening of the auxiliary reservoir.

5. The system according to claim 4 wherein the cap includes a dip stick depending therefrom for indicating the level of lubricant in the auxiliary reservoir, and the spacer is formed with an interior chamber to receive the dip stick when the cap is secured and at least one opening for communicating the interior chamber with the interior of the auxiliary reservoir, so that the level of lubricant in the interior chamber of the spacer equals the level of lubricant in the auxiliary reservoir.

6. In an engine lubrication system having a primary lubricant reservoir for containing lubricant at a predetermined level, an auxiliary lubricant reservoir having a first opening through which lubricant may be added to the system and a second opening for discharging lubricant, and a conduit having one end coupled to the second opening of the auxiliary reservoir and the other end coupled to the primary reservoir for transporting lubricant from the auxiliary reservoir to the primary reservoir, the improvement comprising means for permitting the discharge of lubricant from the auxiliary reservoir to the primary reservoir through the conduit when the level of the lubricant in the primary reservoir is below the predetermined level, a removable cap for hermetically sealing the first opening of the auxiliary reservoir, the cap having a dip stick depending therefrom for indicating the level of lubricant in the auxiliary reservoir, a valve seat formed at the second opening of the auxiliary reservoir, a valve member selectively engaging the valve seat to seal the second opening, biasing means for urging the valve member against the valve seat, and spacer means coupled to the valve member for engaging the cap and displacing the valve member from the valve seat against the force of the biasing means when the cap is secured to seal the first opening of the auxiliary reservoir, the spacer means formed with an interior chamber to receive the dip stick when the cap is secured and at least one opening for communicating the interior chamber with the interior of the auxiliary reservoir, so that the level of lubricant in the interior chamber of the spacer means equals the level of lubricant in the auxiliary reservoir.

* * * * *